United States Patent
Winnacker

[11] 3,939,391
[45] Feb. 17, 1976

[54] APPARATUS FOR CHARGING A HERMETICALLY SEALED ELECTRICAL ENERGY SOURCE

[75] Inventor: Helmut Winnacker, Burgdorf, Germany

[73] Assignee: Preussag Aktiengesellschaft, Germany

[22] Filed: Oct. 31, 1974

[21] Appl. No.: 519,421

[30] Foreign Application Priority Data
Nov. 7, 1973 Germany............................ 2355527

[52] U.S. Cl. ..................... 320/2; 336/115; 336/129
[51] Int. Cl.² ............................................. H02J 7/00
[58] Field of Search ..................... 320/2–5, 5–7; 336/115, 117, 118, 119, 129, 136

[56] References Cited
UNITED STATES PATENTS
| | | | |
|---|---|---|---|
| 2,881,408 | 4/1959 | Dudley | 336/129 X |
| 3,840,795 | 10/1974 | Roszyk et al. | 320/2 |

Primary Examiner—J. D. Miller
Assistant Examiner—Robert J. Hickey
Attorney, Agent, or Firm—Molinare, Allegretti, Newitt & Witcoff

[57] ABSTRACT

An apparatus for charging an electrical energy source secured within a water-tight or hermetically sealed housing. The apparatus includes a transformer having a primary and secondary coil. The secondary coil is secured within the housing, whereby the housing need not be opened to effect charging of the electrical energy source.

5 Claims, 1 Drawing Figure

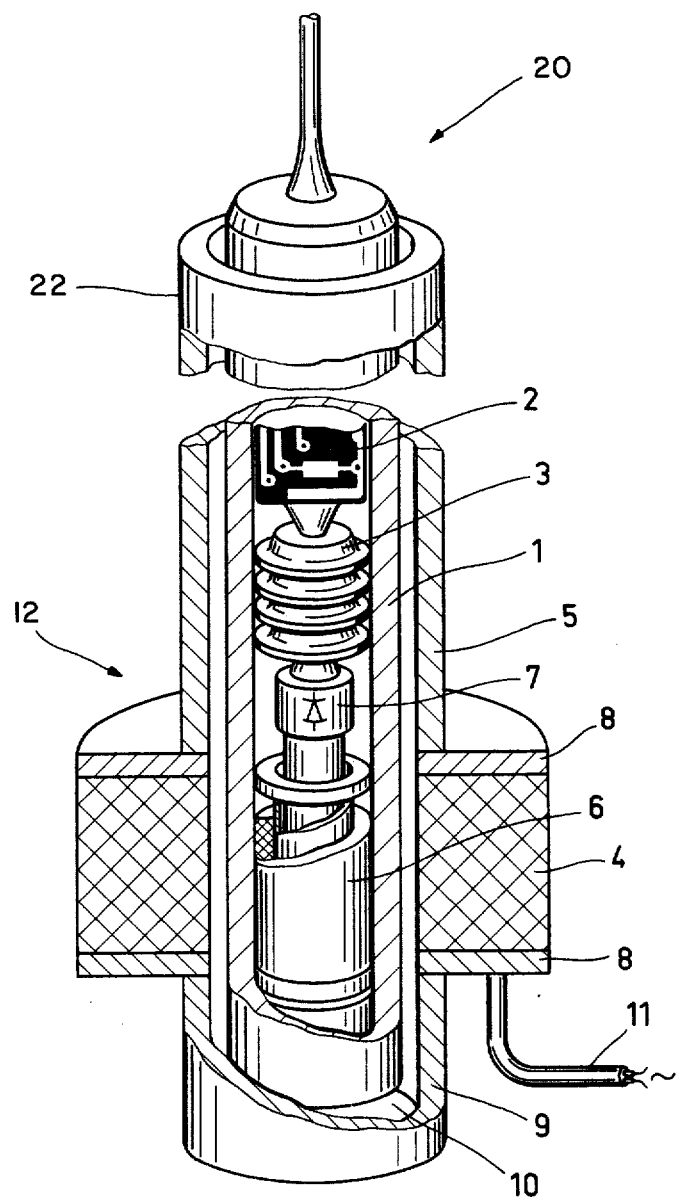

APPARATUS FOR CHARGING A HERMETICALLY SEALED ELECTRICAL ENERGY SOURCE

BACKGROUND OF THE INVENTION

The invention relates generally to an apparatus for charging an electrical energy source and more particularly to a battery charger for an underwater electro-acoustic measuring or position-finding apparatus, having a water-tight housing in which an energy dissipating load is situated together with a chargeable battery for current supply.

An electro-acoustic position-finding transmitter for deep sea use is disclosed in "Ocean Master," a catalogue published by Charles Kerr Enterprises Inc., beginning on page 118 (1971 Edition). The transmitter includes various electrical equipment and a battery secured within a hermetically sealed housing. The battery supplies power to the electrical equipment. Periodically, the housing is opened and the battery is recharged.

Opening of the housing permits the unavoidable spillage and seepage of sea water onto the delicate electrical equipment. In addition, the sealing surfaces of the housing and the sealing arrangement itself are usually damaged, causing leakage. When used at sea, even small scratches or hair cracks in the sealing element permit entry of sea water into the interior chamber of the transmitter housing.

At page 364 of the same catalogue, a second transmitter is shown wherein the electrical load and battery are in separate pressure-resistant housings. Electrical contacts in the intermediate space permit interconnection of the load and battery. In this constructional form, the hermetically sealed housings need not be opened to charge the battery. However, the contacts require protection, such as a suitable grease. But for deep sea use, this technical solution becomes unworkable without constant monitoring and considerable expense.

SUMMARY OF THE INVENTION

It is thus an object of the present invention to provide an apparatus for charging an electrical energy source secured within a water-tight or hermetically sealed housing.

It is a further object of the present invention to provide a charging apparatus for an underwater device, having a water-tight housing and battery therein secured, such as an electro-acoustic position-finder, whereby penetration of sea water into the housing during and after recharging of the battery is substantially avoided.

It is a further object of the present invention to provide an inexpensive and readily manufactured battery charger for underwater use.

In a principal aspect, the present invention is an electrical charging apparatus for use in combination with a sealed, water-tight housing including an electrical energy source and energy dissipating load. The apparatus generally includes a transformer having a primary and secondary coil. The secondary coil is secured within the water-tight housing, e.g., an underwater electro-acoustic transmitter, and is connected to the electrical energy device, e.g., a battery. The primary coil is external to the housing.

The primary coil is operable in an electromagnetically coupled state, i.e., electromagnetically coupled to the secondary coil. When excited in this state, the primary coil induces a voltage and current in the secondary coil and the electrical energy source is thereby charged.

The invention is based upon the inductive transmission of electrical energy into the interior of the hermetically sealed housing. Thus, neither exposed electrical contacts nor opening of the housing are required.

In a preferred constructional form of the present invention, the housing is tubular in shape and the primary and secondary coils are arranged coaxially relative to the housing. The tubular construction of the housing provides satisfactory pressure resistant characteristics and, in addition, permits a particularly suitable primary and secondary coil arrangement. That is, an effective coupling between the primary and secondary coils is achieved. The secondary coil is wound to the maximum possible diameter, i.e., a diameter slightly less than the inside diameter of the tubular housing.

In another aspect, the primary coil of the present invention is annular or ring-shaped. The inside diameter of the primary coil is slightly larger than the outside diameter of the tubular housing, whereby the primary coil can be fitted, without resistance, over the tubular housing. An upper and lower tubular element, having inside diameters slightly larger than the outside diameter of the tubular housing, guide the primary coil into the housing, or, conversely, the housing into the coil. The lower tubular element includes an end or bottom portion. With the tubular housing at rest on the end portion, the secondary coil is positioned within and substantially aligns radially with the primary coil.

These and other features, objects and advantages of the present invention will become apparent in the following detailed description.

BRIEF DESCRIPTION OF THE DRAWING

A preferred embodiment of the present invention will be described, in detail, with reference to the drawing wherein FIG. 1 is a partial cross-sectional view of an underwater position-finding apparatus incorporating a preferred embodiment of the present invention.

DESCRIPTION OF THE PREFERRED EMBODIMENT

Referring to FIG. 1, there is shown an underwater device 20, such as an electro-acoustical position-finding transmitter. The device 20 includes a tubular, pressure-resistant housing 1 having an electrical energy dissipating apparatus 2 and an electrical energy source 3 secured therein. In this preferred embodiment, the energy source 3 is a battery which supplies power for the apparatus 2.

The housing 1 also includes the secondary coil 6 of a transformer, generally designated 12. The secondary coil 6 is coaxial with the housing 1 and substantially engages the internal wall of the housing 1. The secondary coil 6 is connected to the battery 3 through a rectifier 7, such as a four-way rectifier.

The primary coil 4 of the transformer 12 is situated outside of the hermetically sealed housing 1. In this preferred embodiment, the primary coil 4 is annular, having an inside diameter slightly greater than the outside diameter of the housing 1.

The primary coil 4 is wound in a plastic material and is, therefore, self-supporting. Without a coil former, the innermost turns of the primary coil 4 are situated in close proximity with the external wall of the housing 1. As a result, satisfactory electromagnetic coupling with the secondary coil 6 is achieved.

A pair of radially extending flanges 8 cover and adjoin the primary coil 4, as shown. Tubular elements 5 and 9, having inside diameters substantially equal to the inside diameter of the primary coil 4, extend substantially normally from the flanges 8. The lower tubular element 9 has a bottom portion 10. The primary coil 4 and tubular elements 5, 9 cooperatively define a casing, generally designated 22.

In operation, the housing is inserted into the casing 22 and rests upon or abuts the bottom portion 10. The tubular element 9 has a predetermined length, such that the secondary coil 6 is situated substantially within and radially aligns with the primary coil 4 when the housing 1 engages the bottom portion 10. In this position, the primary and secondary coils 4, 6 are in an electromagnetically coupled state.

The primary coil 4 also includes a supply line 11 for connection to a power supply (not shown), such as an alternating current source. When excited, i.e., driven by an alternating current, the primary coil 4 produces an alternating magnetic field and thereby induces a voltage in the secondary coil 6. The secondary coil 6, through rectifier 7, charges the battery 3.

Although a spacing exists between the primary coil 4 and secondary coil 6 and the housing 1 is situated therein, the electromagnetic coupling of the primary and secondary coils 4, 6 produces a sufficiently large induced voltage to charge the battery 3. The relatively weak coupling does, however, substantially eliminate the need for a charging resistor (not shown) in series with the battery 3. Such a resistor would produce a substantial amount of heat in the housing 1 during charging.

As shown, the casing 22 and, more particularly, the primary coil 4 are not rigidly fixed or secured to the underwater device 20. Thus, a single primary coil 4 can be utilized to charge any number of devices 20 designed in accordance with the present invention.

A single preferred embodiment has been herein disclosed. It is to be understood, however, that various changes and modifications could be made without departing from the true scope and spirit of the present invention as set forth and defined in the following claims.

What I claim is:

1. In an underwater device for deep sea use of the type including a water-tight housing, rechargeable energy storage means and energy dissipating means connected thereto, an improved means for charging said rechargeable energy storage means comprising, in combination:

a secondary winding secured within said water-tight housing and interconnected with said rechargeable energy storage means, said water-tight housing and said secondary winding being substantially coaxial;

a primary winding defining a central opening adapted to receive said water-tight housing in a charging state;

means for positioning said primary winding in substantially radial alignment with said secondary winding in said charging state, said primary winding substantially enclosing said secondary winding in said charging state to define an electromagnetic coupling therebetween; and means for exciting said primary winding, whereby a charging current is induced in said secondary winding.

2. An improved charging means as claimed in claim 1 wherein said water-tight housing is substantially tubular.

3. An improved charging means as claimed in claim 2 wherein said primary winding is substantially annular.

4. An improved charging means as claimed in claim 1 further comprising rectifier means interposing said secondary winding and said rechargeable energy storage means.

5. An improved charging means as claimed in claim 1 wherein said primary winding is self-supporting, whereby said primary winding is in close proximity to said water-tight housing in said charging state.

* * * * *